US008964739B1

(12) United States Patent
Wisehart

(10) Patent No.: US 8,964,739 B1
(45) Date of Patent: Feb. 24, 2015

(54) SELF-HEALING DATA TRANSMISSION SYSTEM AND METHOD TO ACHIEVE DETERMINISTIC AND LOWER LATENCY

(71) Applicant: SMG Holdings—Anova Technologies, LLC, Chicago, IL (US)

(72) Inventor: Daniel J. Wisehart, Mission Viejo, CA (US)

(73) Assignee: SMG Holdings—Anova Technologies, LLC, Chicago, IL (US)

( * ) Notice: Subject to any disclaimer, the term of this patent is extended or adjusted under 35 U.S.C. 154(b) by 0 days.

(21) Appl. No.: 14/484,910

(22) Filed: Sep. 12, 2014

Related U.S. Application Data

(60) Provisional application No. 61/877,369, filed on Sep. 13, 2013.

(51) Int. Cl.
*H04L 12/28* (2006.01)
*H04L 12/56* (2006.01)
(Continued)

(52) U.S. Cl.
CPC .............. *H04L 45/44* (2013.01); *H04L 49/351* (2013.01); *H04J 3/16* (2013.01)
USPC .......................................... 370/389; 370/390

(58) Field of Classification Search
CPC ........... H04L 45/44; H04L 49/351; H04J 3/16
USPC .................. 370/387, 388, 389, 390, 338, 342
See application file for complete search history.

(56) References Cited

U.S. PATENT DOCUMENTS 5,548,633 A * 8/1996 Kujawa et al. ............. 379/93.11
6,621,805 B1 9/2003 Kondylis
(Continued)

FOREIGN PATENT DOCUMENTS

EP 1264449 9/2006
EP 2432170 3/2012

OTHER PUBLICATIONS

Sky Pilot Networks: Video Surveillance; http://skypilot.trilliantinc.com/pdf/app_videosurv.pdf.
(Continued)

*Primary Examiner* — Chuong T Ho
(74) *Attorney, Agent, or Firm* — Loeb & Loeb LLP

(57) ABSTRACT

The invention provides a method of simulcasting data fragments sent over a first packet-switched computer network to a trunk network and redistributed over a second packet-switched computer network. A method is provided comprising the steps of providing a trunk network including multiple links including an RF link and a fiber link, wherein all the transmission links transmit data packets to a receiver which will redistribute the earliest data packets with a matching frame check sequence (FCS) over the second packet switched computer network. The method provides for a sender for adding an incremental sender sequence number and sender FCS to the data packets, creating a sender data packet. Transmitting a sender data packet, simulcast over the transmission links, receiving, by a receiver, via the fastest links which may drop or change some bits unintentionally, a sender data packet and receiving, by the receiver, via slower links which are unlikely to drop or change some bits unintentionally, a sender data packet. The method provides for checking, by the receiver, a receiver calculated FCS of the received sender data packet and comparing them to the sender FCS that was added by the sender. Transmitting over the second packet-switched computer network, the first sender data packet with the next sequence number increment after the incremental sender sequence number and verifying sender FCS, verifying, by the receiver, the sender data packets and identifying, by the receiver, a gap between sender data packets, queueing up verified sender data packets when there is a gap in the verified sender data packets and sending all verified sender data packets in sequence order, once the gap is filled by any transmission link.

20 Claims, 5 Drawing Sheets

(51) Int. Cl.
*H04L 12/721* (2013.01)
*H04L 12/931* (2013.01)
*H04J 3/16* (2006.01)

(56) References Cited

U.S. PATENT DOCUMENTS

| | | |
|---|---|---|
| 6,952,401 B1 | 10/2005 | Kadambi et al. |
| 6,977,934 B1 | 12/2005 | Dalby et al. |
| 7,028,281 B1 | 4/2006 | Agrawal et al. |
| 7,283,747 B2 | 10/2007 | Schofield et al. |
| 7,339,923 B2 | 3/2008 | Rogers |
| 7,366,208 B2 | 4/2008 | Bowes |
| 7,586,948 B2 * | 9/2009 | Hiddink et al. ............... 370/473 |
| 7,720,094 B2 | 5/2010 | Turner et al. |
| 8,490,110 B2 | 7/2013 | Hoover et al. |
| 8,537,664 B2 | 9/2013 | Goldfein |
| 2003/0099139 A1 | 5/2003 | Abrosimov et al. |
| 2005/0157715 A1 * | 7/2005 | Hiddink et al. ............... 370/389 |
| 2005/0165968 A1 | 7/2005 | Natarajan et al. |
| 2005/0185577 A1 | 8/2005 | Sakamoto et al. |
| 2007/0086392 A1 | 4/2007 | Sinnarajah et al. |
| 2007/0094474 A1 | 4/2007 | Wilson et al. |
| 2007/0147238 A1 | 6/2007 | Kadambi et al. |
| 2007/0160021 A1 * | 7/2007 | Xhafa et al. ............... 370/338 |
| 2008/0069125 A1 | 3/2008 | Reed et al. |
| 2009/0196303 A1 | 8/2009 | Battle et al. |
| 2010/0191856 A1 | 7/2010 | Gupta et al. |
| 2010/0284692 A1 | 11/2010 | Szell et al. |
| 2011/0153820 A1 | 6/2011 | Atkinson |
| 2013/0129005 A1 | 5/2013 | Xia et al. |
| 2013/0166960 A1 | 6/2013 | Das et al. |

OTHER PUBLICATIONS

Dual Mode P25 Digital/analog Simulcast Radio System; http://radiosolutionsinc.com/files/Download/Dual%20Mode%20Simulcast%20White%20Paper%2005-12.pdf.

Self-healing network for scalable fault tolerant Runtime environments; http://www.open-mpi.org/papers/dapsys-2006-self-healing-network/dapsys-2006-self-healing-network.pdf.

* cited by examiner

SELF-HEALING DATA TRANSMISSION SYSTEM AND METHOD TO ACHIEVE DETERMINISTIC AND LOWER LATENCY

This application pertains to systems and methods for management and control of data packets in order to provide low latency and including radio frequency (RF), free space optics (FSO), (collectively "wireless") and/or fiber optics transmission media.

This application herein incorporates by reference the disclosure of co-pending patent application filed Sep. 12, 2014, entitled, "Packet Sharing Data Transmission System and Relay to Lower Latency" U.S. application Ser. No. 14/484,602.

BACKGROUND

Ethernet and packet-switched Internet Protocol (IP) networks are systems for transmitting data between different points. These systems may be known as "point-to-point" or "contention-based" systems. In many circumstances all transmitters contend for network resources and all transmitters may transmit simultaneously. Due such transmission processes network resources may be oversubscribed, bottlenecks may occur or data may be delayed or lost, resulting in network impairment and high latency rates.

Conventional networks comprise a plurality of Local Area Network (LAN) endpoints, for example computers connected to an Ethernet LAN. Endpoints may be coupled to one or more LAN switches that connect to one or more additional LAN endpoints. If too many packets are simultaneously transmitted by other endpoints, the LAN switch may have a queue overflow, causing latency and/or packets to be lost. ("Packets" mean datagrams in a LAN or Wide Area Network (WAN) environment. In a LAN environment, packets are sometimes called "frames." In a packet-switched WAN environment, packet-switching devices are normally referred to as "routers.")

Delivery protocols for resolving congestion and replacing dropped packets are well known, such as Transmission Control Protocol (TCP). But such solutions may be inappropriate for point-to-point environments and RF transmissions where latency below one microsecond is required, the round-trip propagation delay between stations is excessive and even the latency of waiting for another's single packet to be sent is excessive. Scheduling the transmission of packets by partitioning the packets into discrete frames and subframes is known in order to combat latency issues, but is insufficient in low latency systems. It is possible to schedule packets for delivery during time slots in the subframes corresponding to empirically determined conditions, but there is can be a delay of a one to many subframes before data starts to flow for a given application. Based on the packet size and underlying network bandwidth, some varying fraction of each time slot would be actually used to transmit a packet. Assuming a packet size of 125 bytes (1,000 bits) and a 10BaseT Ethernet operating at 10 mbps, a single 100-microsecond time slot would be used to transmit each packet. With a packet size of 1,500 bytes, twelve of the 100-microsecond intervals would be consumed by each packet transmission.

Configuration maps are known to provide a data structure indicating time slots that have already been allocated to other transmitters for reception by the receiving node (or, alternatively, time slots that have not yet been allocated, or, alternatively, time slots that are candidates for transmission). A reception map is a data structure that indicates time slots during which transmission to the intended receiving node would not conflict with other transmitters. Although there are many ways of representing such a map, one approach is to use a bitmap wherein each bit corresponds to one time slot, and a "1" indicates that the time slot has been allocated to a transmitting node, and a "0" indicates that the time slot has not yet been allocated. If a 100-millisecond delivery interval were divided into 100-microsecond time slots, there would be 1,000 bits in the reception map. The reception map could be larger, for higher bandwidths, for example, for a 100 megabit per second link, the map could have 10,000 bits, etc., to represent the same throughput per slot.

Such processes for handling packets and the assignment of a packet handling identifier are known in order to share resources between retransmitted packets and other transceiver functions. A packet can be forwarded directly to another communication device (or layer) or it may have a specific packet handling identifier, such as a Quality of Service (QOS) level. The QOS level of a packet indicates the importance of certain service metrics of one or more packets. A QOS metric is delay (or latency) and Packet Error Rate (PER) and include Bit Error Rate (BER), data rate, delay variation (or jitter), packet loss rate or time between error events (TBE). Voice or data (e.g., trading) traffic may have very low latency requirements and low packet error rate.

Telecommunication networks use a wide variety of infrastructure methods for transmitting data depending on a variety of factors including the bandwidth of the connection, the need of security for the data, the type of data being transmitted, and the routing of the signals between the source and the destination. Many conventional methods compress the transmitted data into packets that include header information that is used by the network during the transmission process. The use of frames at the data link layer to transport a data payload from a packet may be referred to as "encapsulating" the data. Such conventional encapsulation methods include High-Level Data Link Control (HDLC), Point-to-Point Protocol (PPP) in HDLC-like framing (Internet Engineering Task Force RFC 1662), Multiprotocol Encapsulation (MPE), Generic Stream Encapsulation (GSE), and Unidirectional Lightweight Encapsulation (ULE).

Well known transmission systems include the Ethernet protocol ISO/IEC 8802-3 (ANSI/IEEE Std. 802.3, 1993 edition) that defines a half-duplex media access mechanism and permits all stations to access network channel with equality. Each station includes an Ethernet interface card that uses carrier-sense multiple-access with collision detection (CSMA/CD) to listen for traffic on the media. A station having data to send will attempt to access the channel by waiting a predetermined time after the deassertion of a receive carrier on the media, known as the interpacket gap (IPG) interval is a full duplex environment referred to as IEEE 802.3x, Full Duplex with Flow Control-Working Draft (0.3). Traffic is not distinguished or prioritized over the medium. The full duplex environment provides a two-way, point-to-point communication link between two network stations so two stations can simultaneously transmit and receive Ethernet data packets between each other without collision. An example of data evaluation may include setting the first value of the frame delimiter to 0xC7 (11000111) and setting the second value of the frame delimiter to 0x47 (01000111).

The IEEE 802.3z Task Force has defined shared and full-duplex gigabit Ethernet. Slot time of 512 bytes (4096 bits) is available without increasing the minimum frame length, and providing frame bursting in which a station sends several frames separated by the extend carrier symbols in a single burst. Gigabit Ethernet operates by a station operating according to the conventional CSMA/CD protocol when attempting to transmit the first packet.

IEEE 802.12-1995, "Demand Priority Access Method, Physical Layer and Repeater Specification for 100 Mb/s Operation," also known as the VG ANYLAN network, uses a centralized hub to arbitrate among the requests from network stations. The hub grants access to the stations in a round robin fashion and the VG ANYLAN network requires control by a central hub.

Prior art failover systems such as OSPF-TE require five seconds or more to recognize one link is unusable and when the RF link is up but has a high Bit Error Rate (BER) there may be no failover at all. Once failover is achieved, all of the dropped packets are lost in a UDP/IP low-latency network. Once the RF system returns to normal it may take considerable time for the system to start using RF link again.

However, none of the above systems sufficiently resolve latency issues where gigabit or higher transmissions of data, such as electronic trading, which must have minimal latency and few or no missed packets. Also, each of the above systems fail to provide data transmission with consistently low latency. A system that improves upon the above technologies and protocols that provides data transmission with latency rates below the single, minimum-sized-packet serialization time is needed for point to point networks.

SUMMARY

In an embodiment, the invention provides a method of simulcasting data fragments sent over a first packet-switched computer network to a trunk network and redistributed over a second packet-switched computer network. A method is provided comprising the steps of providing a trunk network including multiple links including an RF link and a fiber link, wherein all the transmission links transmit data packets to a receiver which will redistribute the earliest data packets with a matching frame check sequence (FCS) over the second packet switched computer network. The method provides for a sender for adding an incremental sender sequence number and sender FCS to the data packets, creating a sender data packet. Transmitting a sender data packet, simulcast over the transmission links, receiving, by a receiver, via the fastest links which may drop or change some bits unintentionally, a sender data packet and receiving, by the receiver, via slower links which are unlikely to drop or change some bits unintentionally, a sender data packet. The method provides for checking, by the receiver, a receiver calculated FCS of the received sender data packet and comparing them to the sender FCS that was added by the sender. Transmitting over the second packet-switched computer network, the first sender data packet with the next sequence number increment after the incremental sender sequence number and verifying sender FCS, verifying, by the receiver, the sender data packets and identifying, by the receiver, a gap between sender data packets, queueing up verified sender data packets when there is a gap in the verified sender data packets and sending all verified sender data packets in sequence order, once the gap is filled by any transmission link. The method further comprising the step of dumping, by the receiver, any data packet received when the sender sequence number matches the sequence number of a verified sender data packet.

In an embodiment, the method includes the receiver segmenting good and bad packets when the sender FCS does not match the receiver calculated FCS. In an embodiment, the method involves transmitting good data fragments from any link, in sequence to the correct FIFO register to be distributed to multiple receivers on the second packet-switched computer network.

In an embodiment, the simulcasting alleviates transmission errors due to bad weather, cable interruption or catastrophic events and provides a self-healing function for reliably connecting the two packet switched computer networks. In an embodiment, the RF transmission includes bit level packet sharing and a point-to-point reliable communication over bandwidth limited trunk networks. In an embodiment, a Quality of Service (QOS) protocol is altered to provide an out of band traffic algorithm. In an embodiment, the method includes a console collecting statistics, the statistics being collected while the simulcast transmissions are occurring, wherein the console monitors the sender and receiver. In an embodiment, the method includes a console posting the transmission statistics, after receiving decrypted data from the FIFO register.

In an embodiment, the comparator tests the first and second packet switched computer network, via a comparator, the testing occurring during run time, using the fiber link in order reconfigure a component of the network. In an embodiment, the component is a Field Programmable Grid Array (FPGA) having configurable logic blocks or an Application Specific Integrated Circuit (ASIC) having hard wired logic blocks and changing a map section of the FPGA according to customer reconfiguration requests.

In an embodiment, the method of having a fail-over occur in 100 nanoseconds or less. In an embodiment, the data packet is simulcast at different transmission rates via the RF link and the fiber link. In an embodiment, a deterministic system is provided for precision measurement of latency reduction based on an FPGA clock cycle of 3.103 nanoseconds or less. In an embodiment, the method providing selectors, a FIFO register, trunk network, trunk frame, trunk fragments and customer ports $C_1$ to $C_n$, providing selectors connected to a FIFO output, each selector capable of mapping individual incoming data bits from different customer ports and combining the incoming data bits into trunk fragments where the number of bits in each trunk frame is a pro rata share of the bandwidth designated to each customer ports $C_1$ to $C_n$, filling each trunk fragment with data bits from customer ports $C_1$ to $C_n$, by selector values for each customer.

The method including repeating the filling step for each trunk fragment until sufficient trunk fragments form a filled trunk frame, sending each filled trunk frame across the trunk network having a transmission rate that is less than the sum of all customers incoming bandwidths but equal to the sum of the trunk bandwidth allocation for all customers and transmitting the filled trunk frames from the first incoming packet-switched computer network, through the bandwidth-limited trunk to the second packet-switched computer network and on to an intended receiving network endpoint.

The invention further provides a point-to-point data transmission system comprising, a first packet switched computer network having a sender, a trunk network having a transmission link, a second packet switched computer network having a receiver, a comparator and a FIFO register, the sender simulcasting sender data packets across the transmission link and the receiver analyzing Frame Check Sequence (FCS) data to determine whether the sender data packets are good and transmitting good data packets to the FIFO register for decryption.

In an embodiment, the receiver checks the sender FCS of the received sender data packet and comparing them to the sender FCS that was added by the sender and transmits over the second packet-switched computer network, the first sender data packet with the next sequence number increment after the incremental sender sequence number and verifying sender FCS. In an embodiment, the sender transmits the data packet to a FIFO register of the second packet switched computer network when the sender sequence number matches the sequence number of a verified data packet.

In an embodiment, the receiver dumps the data packet received via the link when the sender sequence number matches the sequence number of a verified data packet. In an embodiment, a trunk network includes multiple links including an RF link and a fiber link, wherein all the transmission links transmit data packets to a receiver, which will redistribute the earliest data packets with a matching frame check sequence (FCS) over the second packet switched computer network providing a sender for adding an incremental sender sequence number and sender FCS to the data packets, creating a sender data packet and transmitting a sender data packet, simulcast over the transmission links. In an embodiment, a receiver receiving, via the RF link which may drop or change some bits unintentionally, a sender data packet and receiving, by the receiver, via fiber link, which are unlikely to drop or change some bits unintentionally, a sender data packet.

As well, the invention provides a logic device providing for low latency transmissions comprising a logic device having logic blocks providing a sender for simulcasting data packets to an RF link and a fiber link, the sender undergoing a frame check sequence (FCS) to provide a sequence number for the data packets, the sender capable of determining good data packets and the logic device having a port to transmit data packets to the RF link and the fiber link in order to provide a self-healing function for reliably connecting two packet switched computer networks.

In an embodiment, at least one SFP+ 10 G transceiver is provided for transmitting data packets to the fiber link and the RF link. In an embodiment, the logic device is located in a first LAN and paired with a second relay located in a second LAN. The sender in the first LAN creates a sender sequence number and an RF sequence number and the second relay has a receiver for segmenting good and bad data packets between the link received data packets and the link received data packets when the sender sequence number does not match the RCF number. In an embodiment, the receiver transmits good data fragments from the link received data packets and good data fragments from the link received data packets, the good data fragments transmitted in sequence to the FIFO register to be decrypted. In an embodiment, the transmissions include bit level packet sharing and a point-to-point construction and a Quality of Service (QOS) protocol that is altered to provide an out of band traffic algorithm.

In an embodiment, a console collects statistics while the simulcast transmissions are occurring, wherein the console monitors the sender and receiver and posting the transmission statistics, via the console, after receiving decrypted data from the FIFO register. In an embodiment, a comparator tests the relay during run time, using the fiber link in order reconfigure the logic device and changing a map section of the logic device according to customer reconfiguration requests.

In an embodiment, a fail-over occurs in 100 nanoseconds or less and the data packet is simulcast at different transmission rates via the RF link and the fiber link. In an embodiment, the logic device provides a deterministic system for precision measurement of latency reduction based on an logic device clock cycle of 3.103 nanoseconds or less. In an embodiment, the logic device is a field programmable grid array (FPGA) having configurable logic blocks (CLB) linked to an SFP+ 10 G transceiver for simulcasting data packets to the RF and fiber links.

Figure 1:
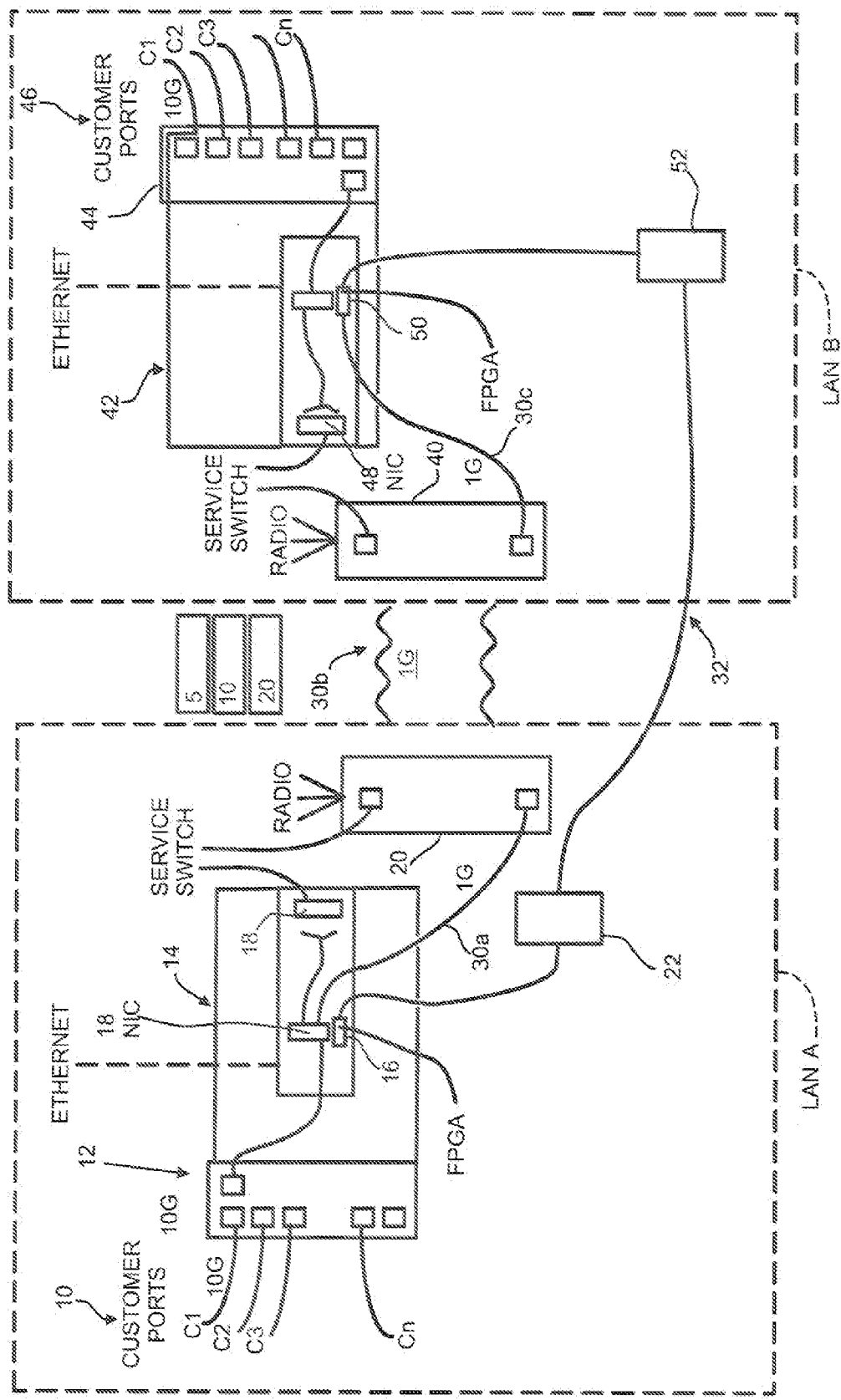
FIG. 1 depicts a schematic view of the components present invention.

While the invention is amenable to various modifications and alternate forms, specific embodiments have been shown by way of example in the drawings and will be described in detail, it should be understood that the intention is not to limit the invention to the particular embodiments described. The intention is to cover all modifications, equivalents and alternatives falling within the spirt and the scope of the invention.

DETAILED DESCRIPTION

The overall architecture of the present invention may be understood with respect to FIG. 1. However, other layouts and system architecture and equipment may be used to accomplish the present invention and the components of FIG. 1 provide a single example to accomplish such invention. Local Area Network (LAN) A is exemplary of a central routing station or data center that receives incoming data from multiple customers $C_1$-$C_n$ via fiber optic or copper cabling 10 (LAN A) or 4b (LAN B). In the preferred embodiment, the data is transmitted from customers at 10 Gigabit speeds (G) and are received by either a switch/relay 12 or an appliance (e.g. relay) that eliminates the switch and can handle multiple, simultaneous 10 G or faster transmissions. For example, many 10 G small form factor pluggable transceivers (SFP), Quad SFP (QSFP) or SFP+ may be used by the switch/relay or appliance to receive the incoming data. Multiple switches 12 or appliances may be provided at the data center for receiving data from hundreds or thousands of customers. Each switch is connected to a server/relay 14, or each appliance, such as relay 14, embodies both the switches and server, preferably also capable of receiving and transmitting data at 10 G. Each relay 14 or appliance includes multiple network interfaces 16 to send, receive, control and manage the data packets.

In an embodiment, a logic device such as a Field Programmable Grid Array (FPGA) may provide data management, network interface and packet control. For example, a Xilinx 7 Series FPGA with thousands of configurable logic block (CLB) may be programmed to accomplish many of the functions of the present invention. (Although "FPGA" is denoted throughout the application, any functionality equivalent electronic circuit or logic device may be used for this invention.) Other types of chips or logic devices may be used for data management, network interface and packet control, such as an ASIC. The server/relay 14 or appliance also includes a network interface card (NIC) 18 which aids in the transmission of the data. In a preferred embodiment, the data is simulcast via a radio 20 which transmits using free space optics (FSO) or a microwave (MW) radio frequency (RF) or a millimeter wave (MMW)RF in multiple hops by line of sight transmission of data at 1 G transmission rate or higher to targeted receivers/antennas via point-to-point trunk network 30b to obtain the data on a second local area network (LAN)

B. In an embodiment, LAN A and LAN B may include a packet switched computer network providing transmissions at 10 Gbs.

In a preferred embodiment, data is simulcast via fiber optic cables or a second RF link using a disparate route to LAN B. A transmitter 22 transmits the data across fiber optic cables 32 or second RF link to the receiving LAN B. A transmitter 22 transmits the data across fiber optic cables 32 to the receiving LAN B. Due to the high importance of receiving data without error and to limited latency, the simulcasting of data across wireless transmission 30*a* and fiber cables 32 provides the needed redundancy in order to avoid dropped packets. As is well known, RF transmissions are affected by weather and on bad weather days the fiber optic transmission means 32 (while not as fast as RF transmissions) may be preferred on such days/stormy periods.

Local area network B represents a receiving location, such as a stock exchange or electronic trading facility. Wireless signals are received by radio 40 and transmitted at 1 G or higher speeds via fiber link 30*c* to server/relay 42 or appliance which includes a network interface card 48 and a motherboard network interface 50 including a MAC layer, for example, on an FPGA. Receiver 52 receives fiber optic or second wireless data from the cable 32 which is transmitted to the server/relay 42. The server/relay is connected to switches 44 or appliances which include transceivers for transmitting data across fiber optic lines or copper lines 46 to customers. The switches may use QSFP transceivers, SFP transceivers or SFP+ transceivers to provide 40 G speeds or higher. In an embodiment, each customer port $C_1$-$C_n$ has a transceiver for transmitting and receiving data bits/packets.

Figure 2:
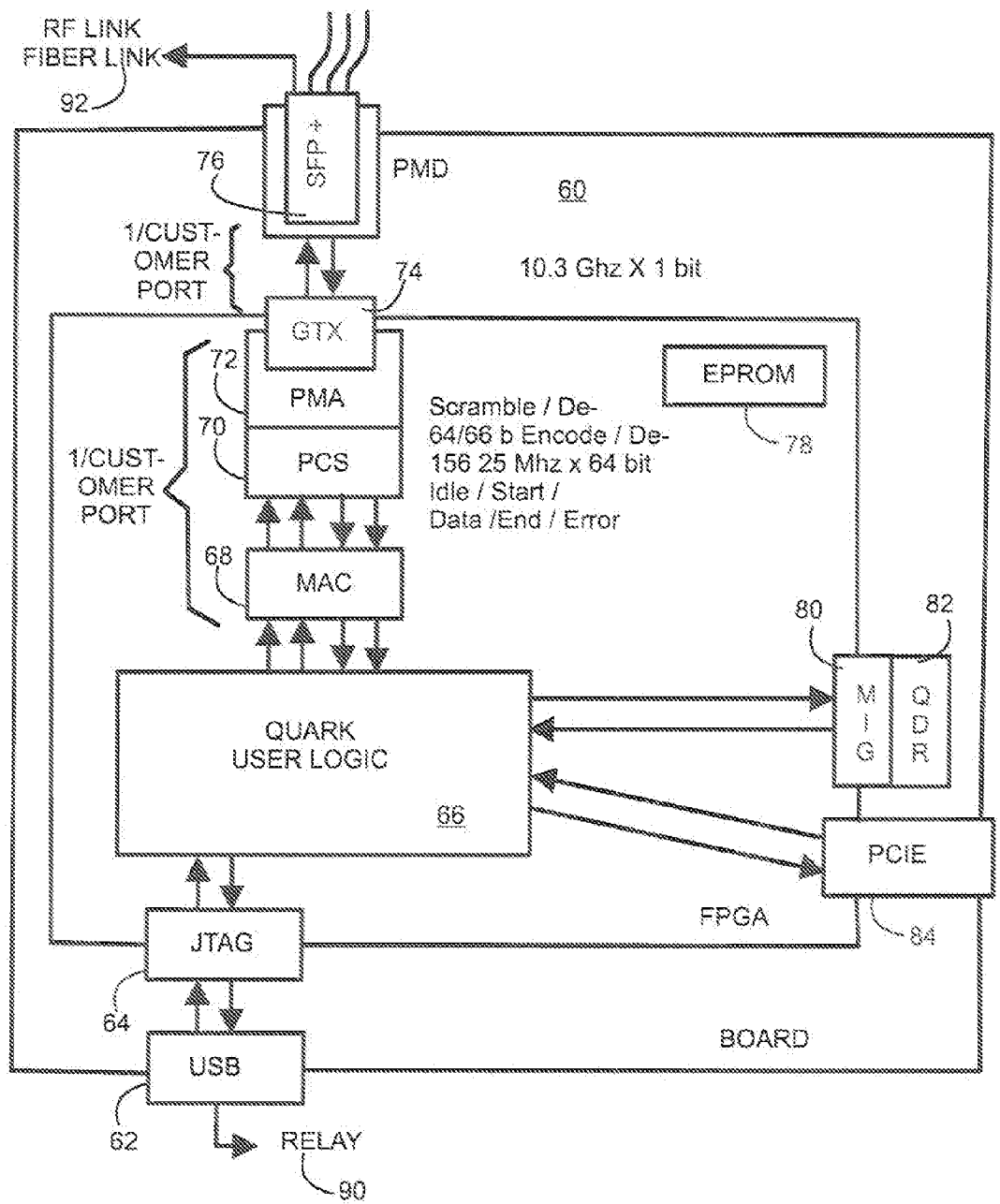
FIG. 2 depicts a board layout view of components of the present invention.

Turning to FIG. 2, the mother board 60 within the server 14, 42 is depicted. The board 60 includes a universal serial bus (USB) 62 for receiving data from a server/relay 90. The data from the USB connection is transmitted from the board to a single processing unit such as FPGA 16. The board 16 also includes a Joint Task Action Group (JTAG) interface 64 under IEEE 1149.1-1990 provides an interconnect between the USB and the user logic 66 of the FPGA. The JTAG 64 provides a serial connection to the FPGA 16 and facilitates programming of the FPGA 16. The functionality of the configurable logic block (CLB) of the user logic 66 will be explained in more detail below. The media access control (MAC) 68 receives the instructions from the user logic 66 that are transmitted via the physical code in sublayer (PCS) then through the physical medium attachment (PMA). And via the GTX filter circuit 72, 74 to transmit the data from the FPGA to the QSFP or SFP+ transceivers 76.

The FPGA 16, 50 may also include an erasable programmable read-only memory (EPROM) 78 as a back-up to store the user logic. A memory interface MGT and QDR 82 are provided by the FPGA for interfacing with the user logic 66. Peripheral component interconnect express (PCIE) 84 is also provided with the FPGA to interact with the user logic 66.

Turning to FIG. 2, the network interface 16 is preferably a single-chip, 32-bit or 64-bit electronic circuit Ethernet controller (e.g. FGPA), and provides an interface between a local bus of a computer, for example, a peripheral component interconnect (PCIE) 84 local bus, and an Ethernet-based gigabit or faster media. The PCIE bus interface unit may be under the control of the DMA buffer management unit receives data that is passed to the PCI bus transmit FIFO buffer described below. The PCIE 84 may be used to dump the bad packets from the receiver 206. A transceiver 76 may send and receive data packets on the network media at gigabit rates across a physical layer device (e.g., a SFP or four gigabit serial transceiver).

In alternate embodiments the network interface 16, 50 may also include a PCI bus interface unit, a direct memory access (DMA) buffer management unit and a network interface portion 16, 50. The network interface portion may include an eXtended Gigabit Media Independent Interface (XGMII) 23*b* for connecting external 1000 Mb/s or 10000 Mb/s transceivers, an External Address Detection Interface (EADI) 23*c*, and an 64*b*/66*b* decoder 24. Full-duplex operation can be performed by the XGMII interface. The interface may also include, an LED control and an expansion bus interface for boot RAM (e.g., EPROM or Flash memory) during startup, and an IEEE 1149.1-compliant JTAG Boundary Scan test access port interface. The network interface 16, 50 may also include a network port manager and an auto-negotiation unit that communicates via the media with a corresponding auto-negotiation unit in the hub serving the network interface with a corresponding auto-negotiation unit in a centralized hub, repeater, or switch that provides shared receive carrier and collision signals between different network stations.

As depicted in FIG. 2, the GTAG 64 manages the reception of the data by the network interface unit 16, 50 and retrieves information form header bytes that are transmitted at the beginning of transmissions. The header information (identifying the byte length of the received frame) is passed to the FIFO control of the user logic 66.

The above-described MAC 68 may be configured to operate in a shared ten gigabit Ethernet network by providing a burst of data packets. Asynchronous data or packetized data can be arranged as datagrams, using the User Datagram Protocol (UDP) and the Internet Protocol (IP). UDP/IP are the fragmented datagrams placed in an IP packet format. The UDP/IP packet is forwarded across a network and the transport and networking layer of the OSI reference model can be sent according to a data layer or physical layer of the OSI reference model according to the Ethernet protocol. The datagrams can be removed from the Ethernet protocol and sent using a different protocol if desired. A PHY transceiver and, specifically, the PHY receiver portion, can decode and recognize 64B/66B encoded data associated with the Ethernet protocol. If the sample rate is 48 MHz, the total bit rate of the network between any two nodes is 48 M/frames sec.×64 bytes/frame×8 bits/byte=24.576 Gbits/sec.

When an electronic circuit logic device such as an FPGA 16 is activated or "powered up," routing tables are broadcast across the control channel to each of the other devices upon the network. The control channel includes configuration (or reconfiguration) routing tables needed to accommodate data transfer between the newly activated device. The routing table is created to accommodate all of the various channels or frame portions established to receive the various types of data. Data is synchronously sent across the network between activated devices. The routing table within a memory medium will then identify which bytes within a frame is associated with a particular channel when subsequent communication is desired. In order to use an existing Ethernet PHY, the compliant network transmission protocol must use 64B/6B coding which Ethernet uses. The recovered clock is available since the Ethernet PHY must generate it to recover data in Ethernet mode.

The Ethernet MAC 68 may have a learning session Ethernet MAC frame and a compression session Ethernet MAC frame and may be divided into a first portion comprising two MAC address fields, and a second portion comprising a rest of the unmodified Ethernet MAC frame.

In an embodiment, the network interface card 18, 48 may have four ports. Port 1 for FR, port 2 for fiber, port 3 for customer transmissions and port 4 for free space optics. However, in an alternate embodiment, the system may be updated to provide between four and thirty-two ports. For example, in a system having 24 ports, there will be 20 extra ports for customer customization. In addition, some of these extra ports may be used for monitoring and controlling the system using out-of-band data communications. In addition, the system may have additional non-Ethernet ports for communication between multiple instances of the system, such as in a Y network layout, where three of the systems will sit in the same rack and communicate between themselves. For example, each of the 20 extra ports may be for a specific customer input. In that way the data packets received at each port will have a designation provided by the port where the data is received. By providing port designations to the data, the packet header information may be reduced—due to the easier management of data incoming from each designated port. In this way the data packets can be managed at a layer one level requiring less handling at layer two of the Ethernet and lower latency.

Figure 3:
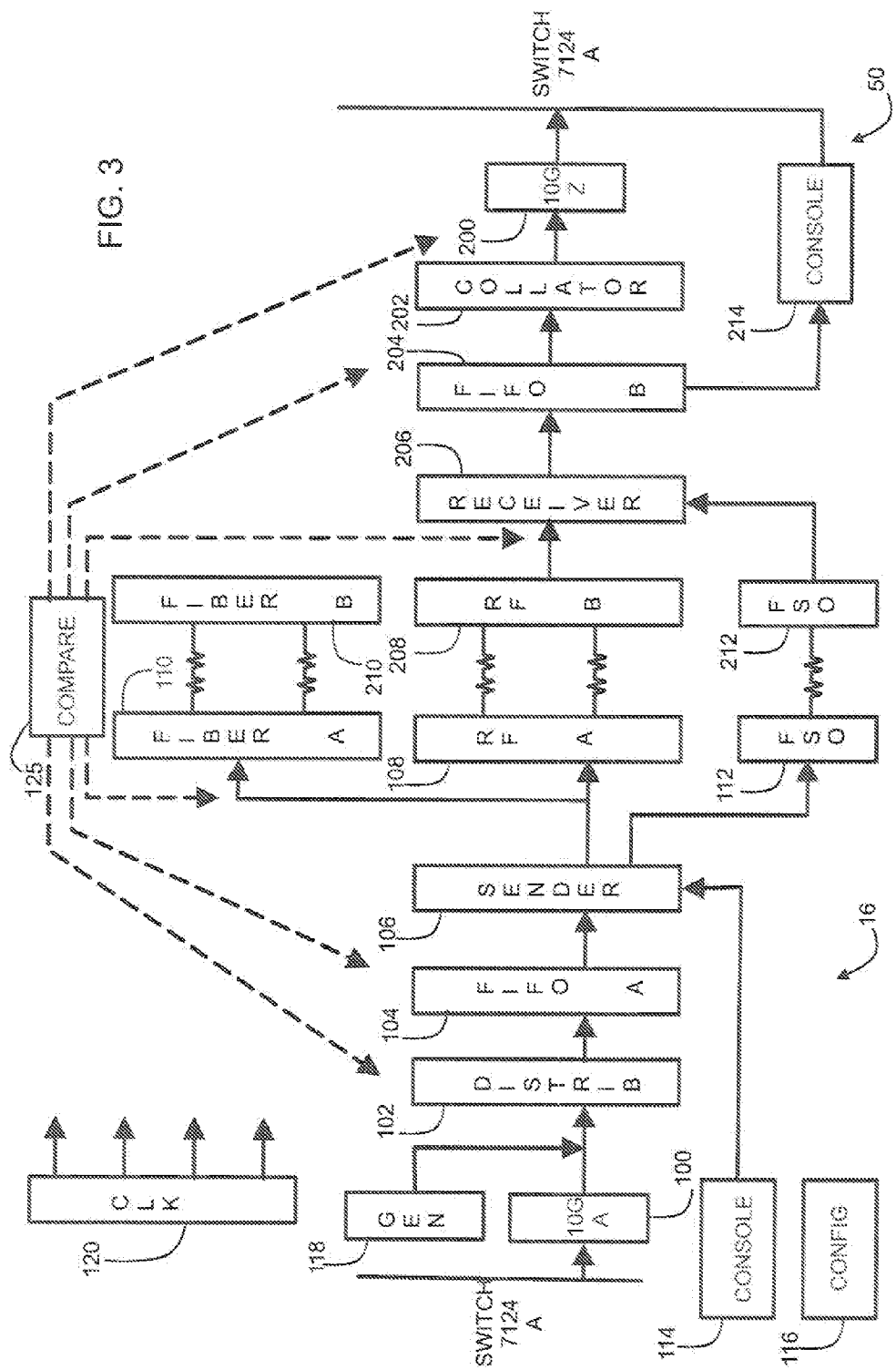
FIG. 3 depicts a schematic view of the functionality of a relay of the present invention.

Turning to FIG. 3, the user logic 66 of the FPGA will be described. The left side of the diagram of FIG. 3 represents the logic device or FPGA 16 of the server 14 located in LAN A and the right side of the diagram of FIG. 3 represents the logic device or FPGA 50 located in server/relay 42 of LAN B. The user logic 66 of the FPGA 16 includes a distributor 102 for receiving 10 G transmissions 100. For example, a 64 bit packet would be received by the distributor 102 and is loaded into the First-In-First-Out (FIFO) register 104.

The FIFO 104 functionality will be described in more detail below. Once the FIFO processing is completed, it transfers the 64 bit data to Sender 106 which transmits the data out of the FPGA as discussed above using transceivers such as a QSFP 76 or other transceiver and simulcast as discussed above through wireless radio 108, a fiber transmission 110 and free space optical transmission 112.

These transmissions are monitored by Console 114. In an embodiment, the Console can also run diagnostic testing at night when the system is inoperable or very few transmissions occur. Configuration block 116 also interacts with the user logic and provides for configuration of the FPGA 16 when the system is not running—usually at night. A Generation block 118 interacts with the Distributor 102 and a clock 120 manages the running of the FPGA 16. A Compare program 125 also monitors data transmission between the FPGAs 16 and 50.

The data transmitted from the FPGA 16 from LAN A is transmitted via simulcast to LAN B (FIG. 1) and is received by the server/relay 42 including FPGA 50 (FIG. 3). Wireless data is received by wireless radio 208 (FIG. 3) which transmits the packets to receiver 206, which are loaded into the FIFO 204. A more detailed description of FIFO 204 will be described below with respect to the present invention. The FIFO 204 transmits its data to the Collator 202, which transmits out of the server/relay via 10 G speeds, preferably.

The FPGA 50 also includes data packet transmissions via fiber 210, which is linked to the Receiver 206 for receiving the data transmission. A free space optical (FSO) transceiver 212 receives fiber transmission and links to the Receiver 206. A Console 214 receives monitoring data from the Receiver 206.

Figure 4A:
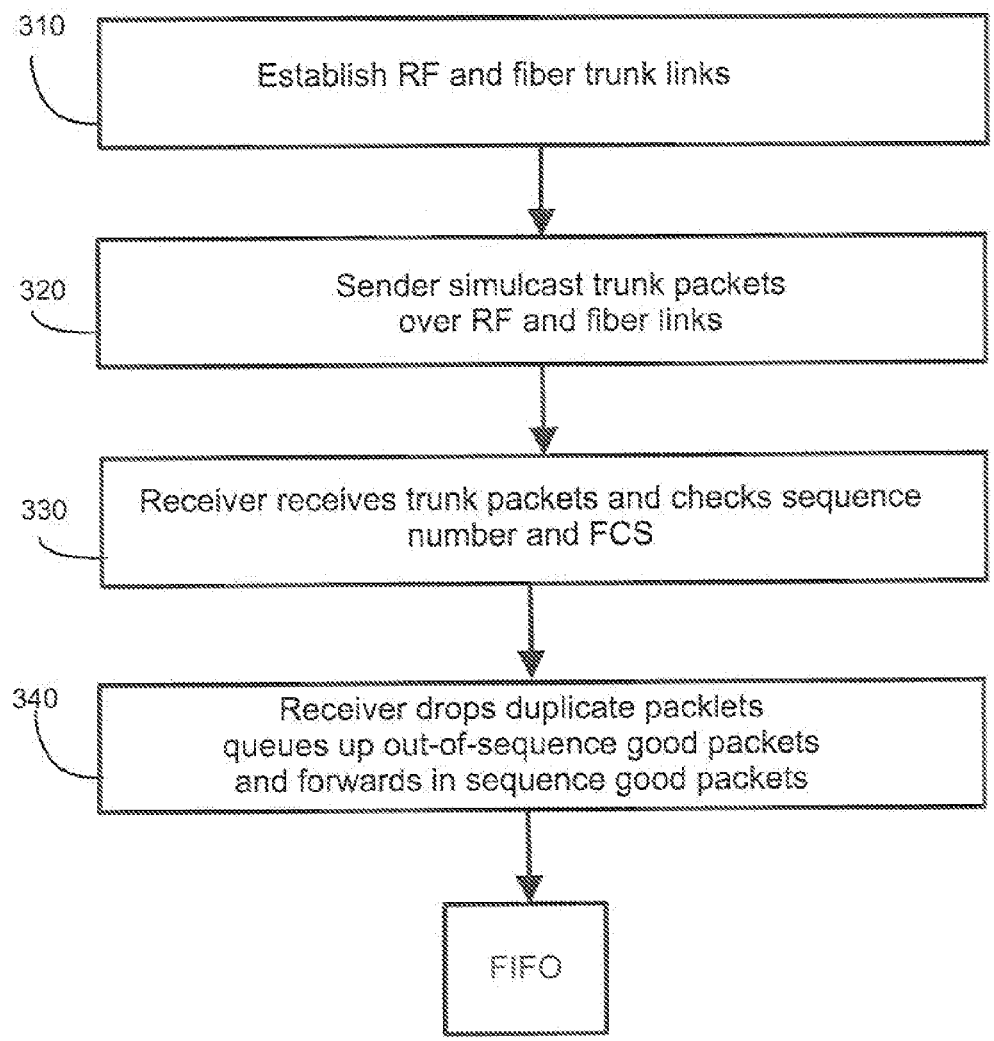
FIG. 4A depicts a flow diagram outlining the operation of an embodiment of the present invention.

Turning to FIG. 4A, the details of the self-healing invention will be described. At step 310, a point-to-point network is established using RF and fiber trunk links to connect the first point-to-point network (LAN A) to the second point-to-point network (LAN B) as described above with respect to the description of FIGS. 1-3. As discussed above, fiber transmissions 30 are depicted in FIG. 1, as are the RF transmissions 32. At step 320 a sender simulcasts packets with a sequence number and frame check sequence (FCS) over RF. The Sender 106 (FIG. 3) uses FCS in order to assign a sequence number to the specific packet being transmitted at that time. Both the RF transmission and fiber transmission are received at the Receiver 206 (FIG. 3) as provided by step 330 (FIG. 4). The Receiver 206 determines whether the data packets received via the RF transmission 30 are accounted for by analyzing the FCS and the sequence number.

In most instances the RF packets are received before the fiber transmission packets due to the lower latency of transmission via RF. At Step 333, if the receiver determines a good transmission of the data packets via the RF, the Receiver 206 will forward the data from the RF packets to the FIFO 204 to decrypt the packets. In the instance where the RF data transmission is a good transmission, the Receiver 206 will dump the fiber packets having the same sequence number.

At step 340, the receiver drops duplicate packets, queues up out of sequence packets if they are determined to be good packet and forwards good packets in sequence. In a case where the sequence number for the incoming packets analyzed by the Receiver 206 shows an error, the Receiver segments the good and bad packets transmitted by RF and forward the good packets from the fiber transmission along with the good packets from the RF transmission in sequence to the FIFO 204 in order to be decrypted.

Figure 4B:
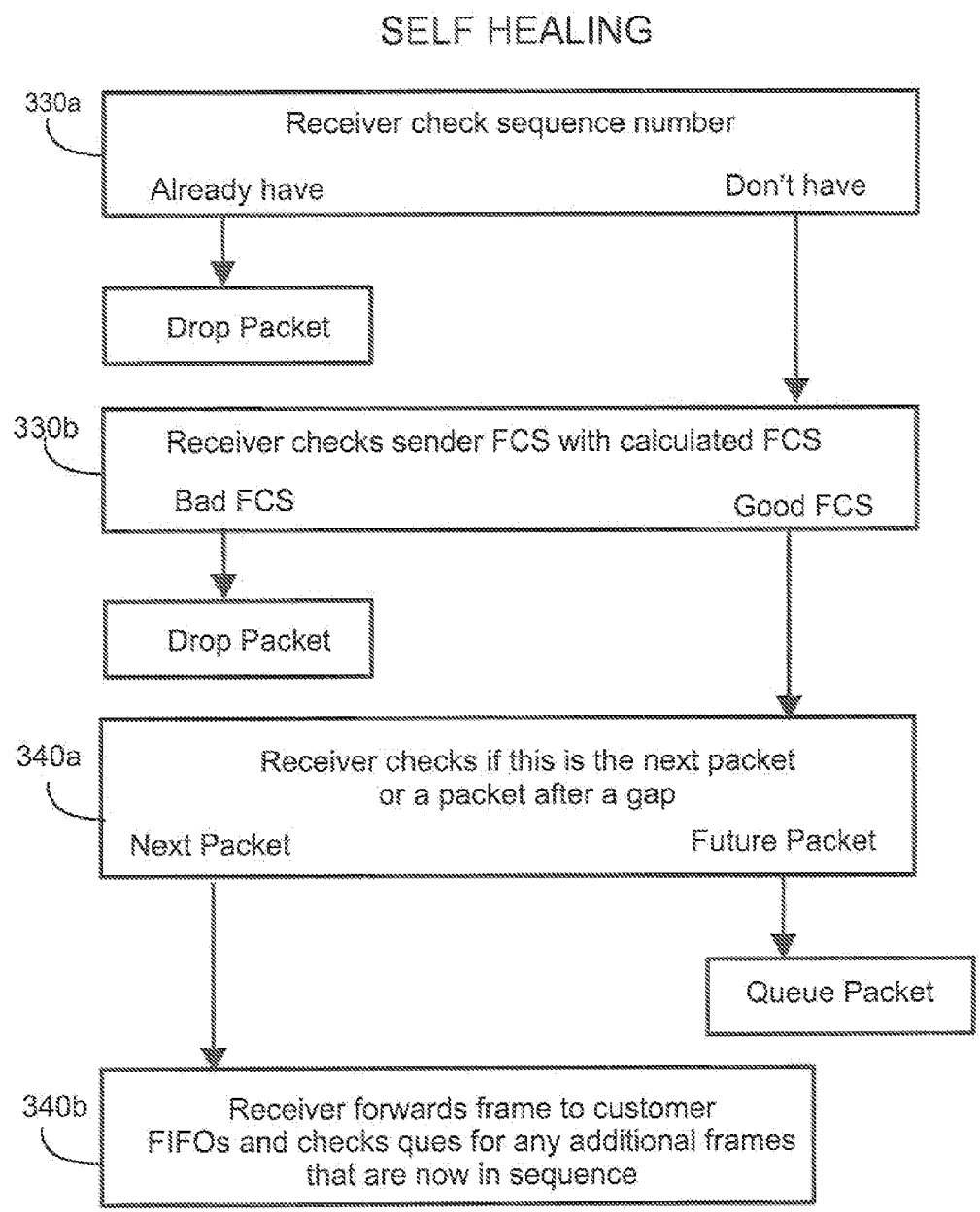
FIG. 4B depicts a flow diagram detailing the operation of the blocks 330 and 340 of FIG. 4A.

To further elaborate the process described above with respect to FIG. 4A, turn to FIG. 4B. At step 330a the receiver checks the sequence number of the trunk/ sender data packet. If the sender data packet already has the sequence number the trunk/ sender data packet is dropped. If the sender data packet does not have the sequence number the trunk/ sender data packet is checked by the receiver and the sender FCS is compared to the calculated FCS. If it's a bad FCS then the sender data packet is dropped. If it is a good FCS the sender data packet is checked by the receiver at step 340a.

The receiver check if it has the next in sequence sender data packet or a sender data packet received after a gap identified between sender data packets. If a gap is identified and it is a future sender data packet after the gap the sender data packet is queued up. If the sequence number indicates it is the next sender packet in sequence, the receiver at step 340b, forwards the trunk/ sender frame to the FIFO and checks for the queues for additional frames in the sequence. These steps are repeated in order to provide a reliable point-to-point self-healing network.

The pseudo code below illustrates the self healing system:
Self Healing Pseudo Code
Sender (these two things happen simultaneously, in parallel, without impacting or slowing down the other):
    while( trunk_frame_ready )
    send_over_RF( trunk_frame );
    while( trunk_frame_ready )
    send_over_fiber( trunk_frame );
Receiver:
    while( receive_RF_trunk_frame ) begin
    if( already_have( RF_trunk_frame ) )
      drop( RF_trunk_frame );
    calcuate_FCS( RF_trunk_frame )
    if( RF_FCS_invalid )
      drop( RF_trunk_frame );
    if( is_next_needed( RF_trunk_frame_sequence_
      number ) ) begin
      give_client_FIFOs( RF_trunk_frame );
      increment( next_needed_sequence_number );
    end
    else
      queue ( RF_trunk_frame );
    end

```
// Completely in parallel with other receiver functionality.
while( receive_fiber_trunk_frame ) begin
if( already_have( fiber_trunk_frame ) )
    drop( fiber_trunk_frame );
// No need to calculate the FCS if this is the last frame
    source.
// If this frame is bad on all sources we forward
// what we received because nothing else is coming.
if( is_next_needed( fiber_trunk_frame_sequence_
    number ) ) begin
    give_client_FIFOs( fiber_trunk_frame );
    increment(next_needed_sequence_number );
end
while( is_next_needed( queued_frames ) ) begin
    give_client_port_FIFOs( queued_frame );
    increment( next_needed_sequence_number );
end
end
```

As illustrated above and as depicted in FIG. 4B, the invention provides a method of simulcasting data fragments sent over a first packet-switched computer network (LAN A) to a trunk network 30b (FIG. 1) and redistributed over a second packet-switched computer network (LAN B) (FIG. 1). The trunk network 30b includes multiple links including an RF link 108, 208 (FIG. 3), a fiber link 110, 210 (FIG. 3) and FSO link 112, 212 (FIG. 3). All the transmission links transmit data packets to a receiver 206 which will redistribute the earliest data packets with a matching frame check sequence (FCS) 330c (FIG. 4B) over the second packet switched computer network. A sender 106 (FIG. 3) adds an incremental sender sequence number at step 330d (FIG. 4B) and sender FCS at step 330e to the data packets and creates a sender data packet. A sender data packet is simulcast over the transmission links. At step 330a, a sender data packet is received by a receiver via the RF link (FIG. 4B). A sender data packet is also received via slower fiber link at step 330b. The receiver checks a receiver calculated FCS of the received sender data packet and compares to the sender FCS that was added by the sender at step 330c (FIG. 4B). At step 330d, first sender data with the next sequence number is transmitted over the second packet-switched computer network (FIG. 4B). The sequence number is incremented after the incremental sender sequence number. At step 330e (FIG. 4B) the sender FCS is verified by the sender data packets at the receiver. At step 330f, a gap is identified between sender data packets at the receiver. Verified sender data packets are queued up at step 330f. Finally when there is a gap in the verified sender data packets they are all sent in sequence order, once the gap is filled by any transmission link at step 330g (FIG. 4B).

It can be understood that the simulcasting and self-healing user logic described can alleviate transmission errors due to be bad weather, cable interruption or other catastrophic events. In an embodiment, the RF transmission may be bit level packet sharing and a point-to-point construction for out of band traffic including scheduling algorithm altered from a quality of service (QOS) protocol.

In an embodiment, the Console 114, 214 may be used to reconfigure the user logic 66. The Console in a preferred embodiment operates over fiber 110, 210, when no simulcast of customer data packets is occurring—usually at night. Also the Console 114, 214 can be used to collect statistics during the day while the simulcast transmissions are occurring between the networks 16 and 50. The Console 214 will monitor the Sender 106 and the Console 214 will monitor the Receiver 206 to collect transmission statistics. Console 214 interacts with the USB port to obtain received configuration data and may help with remote configuration over the fiber.

The receiver side may tell the Collator 202 (FIG. 3) to map the configuration. In an embodiment, the statistics collected by the Console 114, 214 may be displayed through the Console and retrieved in person at LAN A or LAN B. In an alternate embodiment, the Console 114, 214 may be connected to a monitor and statistics posted on a webpage, so that the transmission statistics may be viewed via internet or intranet. The Collator 202 can send customer data-potentially to multiple customers at the same time with a multi-port appliance—after it receives the decrypted data from FIFO 204.

The Comparator 125 (FIG. 3) may test the system during run time using the fiber pathways 110, 210 to provide for testing. In an embodiment a configuration for Linux is used which may be transmitted over the fiber 110, 210 in order to update or reconfigure the FPGAs 16, 50. Using the fiber connection, the FPGA may be remotely updated and the map section changed according to change in customer reconfiguration requests. These changes may be done while the system is in operation. As well, adding new customers may be undertaken while the system is running.

Prior art failover systems such as OSPF-TE require five seconds or more to recognize one link is unusable and when the RF link is up but has a high Bit Error Rate (BER) there may be no failover at all. In contrast, our system fails over in nano-seconds, never dropping packets that make it through the slower path and returning to the faster RF link within nanoseconds—as soon as a single good packet comes through.

The present system also provides for a deterministic system due to the predictability of the clock cycle of 3.2 nanoseconds for a typical FPGA that allow for precision measurement of latency reduction.

In an embodiment, further lowering of latency can be achieved by combining the above described self-healing system with a system for packet sharing as described in co-pending application by the same assignee as to this application, described as follows: The sender 106 (FIGS. 3, 5) creates a 77×16 frame with 16 possible bit positions; a single selector per customer that uses a 6 bit value puts bits in sequence into proper sender bit locations; the sender 106 has 16 selectors that take 4 bit values to select and customer fills each sender bit. The system provides a First-In First-Out (FIFO) register to capture incoming data bits from each customer port in parallel and speeds equal to or greater than 1 Gbps, providing selectors connected to the FIFO outputs. Each trunk fragment receives data bits from customer ports, by selector values for each customer. The invention provides selectors connected to the FIFO outputs, each selector capable of mapping individual incoming data bits from different customer ports and combining them into the same trunk fragments where the number of bits in each trunk frame is a pro rata share of the bandwidth designated to each customer ports C1 to Cn. The filling sequence for each fragment is for each sender 16 bit frame, then providing different selector values for each frame until a custom 1,248 bit trunk frame is ready for point-to-point transmission from the sender 106 (FIGS. 3, 5). So in combination with the payload altering system of the present invention, latency is drastically reduced down to 0.024 microseconds for round trip transmission in some embodiments.

The above described functionality may be implemented in any point-to-point or serial transmission type system. Numerous variations and modifications will become apparent to those skilled in the art once the above disclosure is fully appreciated. It is intended that the claims be interpreted to embrace all such variations and modifications.

The invention claimed is:

1. A method of simulcasting data fragments sent over a first packet-switched computer network to a trunk network and redistributed over a second packet-switched computer network, the method comprising the steps of:
   providing a trunk network including multiple links including an RF link and a fiber link, wherein the links transmit data packets to a receiver, which will redistribute the first data packet that reaches the receiver first, redistributing the first data packet with a matching frame check sequence (FCS) over the second packet switched computer network;
   providing a sender for adding an incremental sender sequence number and sender FCS to the data packets, the sender creating a sender data packet and transmitting the sender data packet as a simulcast over the links;
   receiving, by a receiver, via the RF link a sender data packet;
   receiving, by the receiver, via the fiber link, a sender data packet;
   checking, by the receiver, a receiver calculated FCS of the received sender data packet and comparing the receiver calculated FCS to the sender FCS that was added by the sender;
   transmitting over the second packet-switched computer network, the first sender data packet with the next sequence number increment after the incremental sender sequence number and verifying the sender FCS;
   verifying, by the receiver, the sender data packets;
   identifying, by the receiver, a gap between sender data packets;
   queueing up verified sender data packets when there is a gap in the verified sender data packets; and
   sending all verified sender data packets in sequence order, once the gap is filled by any link.

2. The method of claim 1 further comprising the step of dumping, by the receiver, any data packet received when the sender sequence number matches the sequence number of a verified sender data packet.

3. The method of claim 1, further comprising the step of segmenting, by the receiver, good and bad packets when the sender FCS does not match the receiver calculated FCS.

4. The method of claim 3, further comprising the step of transmitting good data fragments from any route, in sequence to the correct FIFO register to be distributed to multiple receivers on the second packet-switched computer network.

5. The method of claim 1, wherein the simulcasting alleviates transmission errors due to bad weather, cable interruption or catastrophic events and provides a self-healing function for reliably connecting the two packet switched computer networks.

6. The method of claim 1, wherein the RF transmission includes bit level packet sharing and a point-to-point reliable communication over bandwidth limited trunk networks.

7. The method of claim 6, wherein a Quality of Service (QOS) protocol is altered to provide an out of band traffic algorithm.

8. The method of claim 1, further comprising the step of collecting statistics, by a console, the statistics being collected while the simulcast transmissions are occurring, wherein the console monitors the sender and receiver.

9. The method of claim 8, further comprising the step of posting the transmission statistics, via the console, after receiving decrypted data from the FIFO register.

10. The method of claim 9, further comprising the step of testing the first and second packet switched computer network, via a comparator, the testing occurring during run time, using the fiber link in order reconfigure a component of the network.

11. The method of claim 10, wherein the component is a Field Programmable Grid Array (FPGA) having configurable logic blocks or an Application Specific Integrated Circuit (ASIC) having hard wired logic blocks and changing a map section of the FPGA according to customer reconfiguration requests.

12. The method of claim 1, further comprising the step of having a fail-over occur in 100 nanoseconds or less.

13. The method of claim 1, where the data packet is simulcast at different transmission rates via the RF link and the fiber link.

14. The method of claim 13, wherein a deterministic system is provided for precision measurement of latency reduction based on an FPGA clock cycle of 3.103 nanoseconds or less.

15. The method of claim 1, further comprising the step of:
   providing selectors, a FIFO register, trunk network, trunk frame, trunk fragments and customer ports $C_1$ to $C_n$;
   providing selectors connected to a FIFO output, each selector capable of mapping individual incoming data bits from different customer ports and combining the incoming data bits into trunk fragments where the number of bits in each trunk frame is a pro rata share of the bandwidth designated to each of the customer ports $C_1$ to $C_n$;
   filling each trunk fragment with data bits from customer ports $C_1$ to $C_n$, by selector values for each customer;
   repeating the filling step for each trunk fragment until sufficient trunk fragments form a filled trunk frame;
   sending each filled trunk frame across the trunk network having a transmission rate that is less than the sum of all customer incoming bandwidths but equal to the sum of the trunk bandwidth allocation for all customers; and
   transmitting the filled trunk frames from the first incoming packet-switched computer network, through the bandwidth-limited trunk to the second packet-switched computer network and on to an intended receiving network endpoint.

16. A point-to-point data transmission system comprising:
   a first packet switched computer network having a sender to send data packets;
   a trunk network having a transmission link;
   a second packet switched computer network having a receiver, a comparator and a FIFO register;
   the sender adding an incremental sender sequence number and sender FCS to the data packets and simulcasting sender data packets across the transmission link
   the receiver analyzing Frame Check Sequence (FCS) data to determine whether the sender data packets are good and transmitting good data packets to the FIFO register for decryption and the receiver checking the sender FCS of the received sender data packet and comparing a receiver calculated FCS to the sender FCS that was added by the sender; and
   transmitting over the second packet-switched computer network, a first sender data packet with a next sequence number increment after the incremental sender sequence number and verifying the sender FCS.

17. The system of claim 16 wherein the sender transmits the data packet to a FIFO register of the second packet switched computer network when the sender sequence number matches the sequence number of a verified data packet.

18. The system of claim 16 wherein the receiver dumps the data packet received via the link when the sender sequence number matches the sequence number of a verified data packet.

19. The system of claim 16 further comprising:
- a trunk network including multiple links including an RF link and a fiber link, wherein all the transmission links transmit data packets to a receiver, which will redistribute the earliest data packets with a matching frame check sequence (FCS) over the second packet switched computer network;
- providing a sender for adding an incremental sender sequence number and sender FCS to the data packets, creating a sender data packet;
- transmitting the sender data packet, simulcast over the transmission links;
- receiving, by a receiver, via the RF link, a sender data packet;
- receiving, by the receiver, via fiber link, a sender data packet.

20. The method of claim 16 further comprising the step of transmitting over the second packet-switched computer network, the first sender data packet with sequence number and sender FCS, which will be used by the receiver in case the sender FCS from the packet sent over the trunk network does not match the receiver calculated FCS.

\* \* \* \* \*